United States Patent
Kulcke et al.

(10) Patent No.: US 7,386,990 B2
(45) Date of Patent: Jun. 17, 2008

(54) EVAPORATOR ARRANGEMENT FOR AN AIR CONDITIONING SYSTEM OF AN AIRCRAFT

(75) Inventors: Walter Kulcke, Jork (DE); Thomas Scherer, Hamburg (DE)

(73) Assignee: Airbus Deutschland GmbH (DE)

( * ) Notice: Subject to any disclaimer, the term of this patent is extended or adjusted under 35 U.S.C. 154(b) by 100 days.

(21) Appl. No.: 11/146,697

(22) Filed: Jun. 7, 2005

(65) Prior Publication Data

US 2005/0284175 A1 Dec. 29, 2005

Related U.S. Application Data

(60) Provisional application No. 60/578,419, filed on Jun. 9, 2004.

(30) Foreign Application Priority Data

Jun. 9, 2004 (DE) ........................ 10 2004 028 037

(51) Int. Cl.
*F25B 47/00* (2006.01)
*F25B 39/02* (2006.01)

(52) U.S. Cl. .......................................... 62/278; 62/515

(58) Field of Classification Search ............ 62/89, 62/91, 171, 176.6, 176.4, 304, 309, 419, 62/278, 515; 165/222; 261/130, DIG. 34; 454/157

See application file for complete search history.

(56) References Cited

U.S. PATENT DOCUMENTS

| | | | | |
|---|---|---|---|---|
| 2,144,693 A | | 1/1939 | Seid | 236/44 |
| 2,548,448 A | * | 4/1951 | Simpson | 165/63 |
| 2,610,032 A | * | 9/1952 | Shagaloff | 165/228 |
| 2,823,015 A | * | 2/1958 | Whitlow | 165/228 |
| 3,464,400 A | | 9/1969 | Wellman | 126/113 |
| 3,547,348 A | * | 12/1970 | Kruper | 236/44 B |
| 4,272,014 A | | 6/1981 | Halfpenny et al. | 236/44 B |
| 4,755,360 A | | 7/1988 | Dickey et al. | 422/122 |
| 4,803,849 A | | 2/1989 | Diaz | 62/311 |
| 5,037,585 A | | 8/1991 | Alix et al. | 261/142 |
| 5,359,692 A | | 10/1994 | Alix et al. | 392/327 |
| 5,400,608 A | * | 3/1995 | Steed et al. | 62/91 |
| 5,595,690 A | | 1/1997 | Filburn et al. | 261/104 |
| 5,695,117 A | * | 12/1997 | Sizemore et al. | 236/44 A |
| 5,806,762 A | * | 9/1998 | Herr et al. | 236/44 A |
| 6,099,404 A | * | 8/2000 | Hartenstein et al. | 454/157 |

(Continued)

FOREIGN PATENT DOCUMENTS

DE 1779002 8/1971

(Continued)

OTHER PUBLICATIONS

European Patent Office Search Report. 5 pages.

*Primary Examiner*—Mohammad M. Ali
(74) *Attorney, Agent, or Firm*—Ostrolenk, Faber, Gerb & Soffen, LLP

(57) ABSTRACT

The present invention relates to an evaporator arrangement for an air conditioning system of an aircraft, wherein a bypass conduit is provided which can be connected such that if required at least part of the airflow bypasses an evaporator. Advantageously this makes it possible in the case of malfunction of the evaporator to maintain the functionality of the air conditioning system.

13 Claims, 2 Drawing Sheets

U.S. PATENT DOCUMENTS 6,129,285 A * 10/2000 Schafka .................. 236/44 C
6,511,052 B1 * 1/2003 Tonkin et al. ............... 261/101

FOREIGN PATENT DOCUMENTS

| | | |
|---|---|---|
| EP | 0 031 701 | 9/1984 |
| EP | 0 301 212 | 2/1989 |
| EP | 0632240 A1 * | 1/1995 |
| FR | 2 530 968 | 2/1984 |
| FR | 0 779 207 B | 3/2000 |
| GB | 325515 | 2/1930 |
| GB | 829873 | 3/1960 |
| GB | 971163 | 9/1964 |
| GB | 996166 | 6/1965 |
| WO | WO 91/12990 | 9/1991 |

* cited by examiner

EVAPORATOR ARRANGEMENT FOR AN AIR CONDITIONING SYSTEM OF AN AIRCRAFT

CROSS REFERENCE TO RELATED APPLICATION

The present application claims priority under 35 U.S.C. § 119 of German Application No. 10 2004 028 037.1, filed Jun. 9, 2004 and claims the benefit under 35 U.SC. § 120 of U.S. Provisional Application No. 60/578,419, filed Jun. 9, 2004 incorporated herein by reference.

FIELD OF THE INVENTION

The present invention relates to air conditioning in an aircraft. In particular, the present invention relates to an evaporator arrangement for an air conditioning system of an aircraft, to an air conditioning system for an aircraft, to an evaporator pad for use in a direct evaporator in an air conditioning system of an aircraft, and to a method for operating an evaporator arrangement of an air conditioning system of an aircraft.

TECHNOLOGICAL BACKGROUND

Especially in pressurised cabins of commercial aircraft and transport aircraft, the humidity of the air can drop during flight. For example the humidity of the air can drop to as little as 3% relative humidity (% RH) at room temperature. Passengers may consider such low humidity uncomfortable.

In order to increase thermal comfort, the cabin air can be humidified in part or in whole. U.S. Pat. No. 5,359,692 describes a system which uses electrical energy for evaporating water. U.S. Pat. No. 4,272,014 and EP 0 031701 describe systems which use hot air to evaporate water. In these systems the water vapour is mixed with the cooled air and is supplied to the air conditioning unit. These systems are associated with a disadvantage in that the thermal load in the cabin is increased by mixing water vapour with hot air.

Furthermore, there are air humidifiers which are based on the principle of cold evaporation, such as for example the diaphragm humidifier described in U.S. Pat. No. 5,595,690. EP 0 779 207 B1 describes an atomiser and an evaporator with a porous dripper bed.

In particular in aircraft engineering, individual components have to be highly reliable.

SUMMARY OF THE INVENTION

According to an embodiment of the present invention, an evaporator arrangement for an air conditioning system of an aircraft is provided, which air conditioning system comprises a main air conduit, a bypass conduit and an evaporator. The evaporator is arranged in the main air conduit in such a way that an airflow in the main air conduit flows through the evaporator. If required, the bypass conduit can be connected in such a way that at least part of the airflow bypasses the evaporator.

This may make possible safe operation of the evaporator arrangement to the effect that when the evaporator is blocked, for example by ice crystals or dirt, the airflow can continue to be maintained because it is directed past the blocked evaporator. The aircraft's air conditioning system can therefore continue to operate even if the evaporator is blocked, so that only the humidification of the air ceases to operate.

According to a further embodiment of the present invention, a safety valve is arranged between the main air conduit and the bypass air conduit, which safety valve opens the bypass air conduit at least in part if a predefined pressure in the main conduit upstream of the evaporator is exceeded, so that at least part of the air from the main air conduit bypasses the evaporator.

This may ensure automatic operation without the need for the safety valve to be activated by an operator.

According to a further exemplary embodiment of the present invention, a diffuser is provided in the air conduit upstream of the evaporator, which diffuser forms the airflow in such a way that the airflow comprises flow lines of essentially identical speed.

This may make possible an as homogeneous a load of the evaporator as possible because the flow lines of the airflow impinging on the evaporator are essentially of identical speed.

According to a further exemplary embodiment of the present invention, between the diffuser and the evaporator a grille or grid, for example comprising a honeycomb structure, can be provided in order to further even out the flow of the airflow. This can generate a particularly homogeneous airflow that impinges on the evaporator.

According to a further exemplary embodiment of the present invention, a temperature sensor is provided. According to one aspect of this embodiment, the temperature sensor is arranged in a flow direction of the airflow upstream of the evaporator. The temperature sensor may detect excessive temperatures in the airflow upstream of the evaporator, for example in order to prevent damaging the evaporator or the air conditioning system, or to prevent injury to passengers.

According to a further exemplary embodiment of the present invention, the evaporator has a flow direction. The flow direction is a direction in which air can flow through the evaporator with the least amount of resistance. According to one aspect of this embodiment, the evaporator is arranged in the main air channel such that the flow direction of the evaporator is not arranged so as to be orthogonal in relation to the flow direction of the airflow impinging on the evaporator. In other words, the evaporator is arranged so as to be across the airflow direction or inlined to the airflow impinging onto the evaporator. An angle between the flow direction of the evaporator and the airflow impinging on the evaporator can be between 0° and somewhat less than 90°.

According to a further exemplary embodiment of the present invention, a deflector comprising a honeycomb structure can be provided on the evaporator in order to deflect flow lines of the air flow into the evaporator. This may make possible homogeneous and even use of the evaporator since the airflow is introduced to the evaporator essentially evenly across the surface of said evaporator. Dead zones, i.e. zones in which there is no airflow through the evaporator, may be avoided.

According to a further exemplary embodiment of the present invention, the evaporator arrangement comprises a housing. The housing may be designed so as to be sound absorbent.

This embodiment of the present invention may make it possible for the evaporator arrangement to be integrated on positions of sound absorbers. The sound absorber at the same time has an insulating effect so that the temperature loss across the evaporator can be kept low.

According to a further exemplary embodiment of the present invention, the evaporator is a direct evaporator comprising an absorbent porous, inorganic material, such as for example glass fibres bound in inorganic adhesives.

This may make possible a sturdy and capable evaporator which can be produced at low cost.

Furthermore, the present invention relates to an air conditioning system for an aircraft, comprising an evaporator arrangement according to one of the above embodiments. The air conditioning system can also comprise components, such as for example a control unit or various mixers.

According to a further exemplary embodiment of the present invention, an evaporator pad for arrangement in a direct evaporator in an air conditioning system of an aircraft is provided. The evaporator pad comprises an absorbent element with a flow-through direction which, as discussed above, is the direction of the absorbent element, along which flow-through direction an airflow can flow through the absorbent element with minimum resistance. For arrangement in the direct evaporator, the absorbent element is adapted in such a way that the flow-through direction is not necessarily aligned so as to be orthogonal or perpendicular to the direction of flow of an airflow impinging on the absorbent element. Furthermore, for arrangement, the absorbent element can be designed such that air can bypass the absorbent or absorptive element, for example in a bypass conduit.

According to a further exemplary embodiment of the present invention, a flow direction device comprising a honeycomb structure can be arranged on the absorbent element in order to make possible clean, even guide-in of the airflow into the absorbent element.

According to a further exemplary embodiment of the present invention, a method for operating an evaporator arrangement for an air conditioning system of an aircraft is stated, wherein according to the method the evaporator is operated in the main conduit in such a way that an airflow in the main air conduit flows through the evaporator. When required, for example if the evaporator becomes blocked as a result of ice or dirt, the bypass conduit can be connected such that at least part of the airflow bypasses the evaporator.

In this way, operation of the air conditioning system or of the evaporator arrangement can be made possible even if the evaporator is blocked.

According to a further exemplary embodiment of the present invention, the temperature of the airflow is measured upstream of the evaporator. The measured temperature is used to control the temperature in the air conditioning system.

This can help to prevent overheating of various components in the air conditioning system.

The present invention may make possible humidification of cabin air in an aircraft by means of a direct evaporator, as well as integration of the direct evaporator in the air conditioning system. The present invention may make it possible for the available space to be optimally used, or for the design height and design width of the evaporator arrangement to be minimised. Above all, the present invention may make it possible, in applications in an aircraft, to avoid any loss of pressure, in particular in the case of limited functionality of the air conditioning system. Furthermore, for example in the case of failure or partial failure of the evaporator, it may be ensured that the functionality of the air conditioning system is not impeded. In particular the present invention is believed to make it possible to detect excessive temperatures and to take early countermeasures. Such excessive temperatures may occur on parts or components of the air conditioning system.

SHORT DESCRIPTION OF THE DRAWINGS

Below, exemplary embodiments of the present invention are described in more detail with reference to the figures stated.

DETAILED DESCRIPTION OF EXEMPLARY EMBODIMENTS

In the following description of FIGS. 1 and 2 identical or corresponding elements are designated using the same reference figures.

Figure 1:
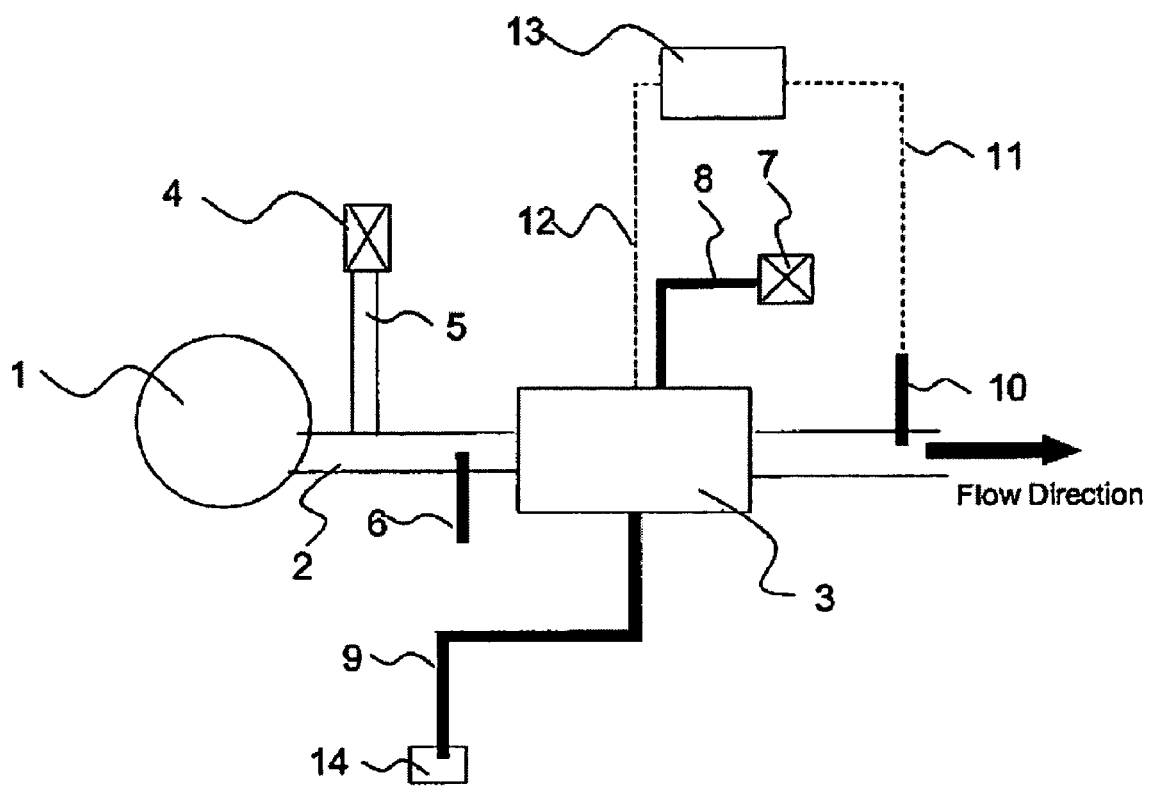
FIG. 1 shows a diagrammatic representation of an embodiment of an air conditioning system for an aircraft, according to the present invention.

FIG. 1 is a diagrammatic representation of an air conditioning system for an aircraft according to an exemplary embodiment of the present invention. FIG. 1 in particular shows the way in which, according to the present invention, a direct evaporator is integrated in the air conditioning system of a commercial aircraft or transport aircraft. Reference number 1 designates a central or decentralised mixer unit 1 which mixes two airflows which can comprise recirculated air and outside air. According to a variant of this embodiment, the mixer unit 1 can also be designed to mix two recirculating airflows. From the mixer unit 1, one or several airflows 2 emanate, whose temperature can be adjusted by means of admixing hot air 5. The hot air 5 can for example be engine bleed air. A valve 4 is provided for dosing the hot air 5. The valve is connected to a control device (not shown in FIG. 1) which evaluates temperature data from the cabin and from the temperature sensors 6 and 10 installed in the air conditioning plant, and adjusts the valve position to the actual and desired temperature values. The temperature sensor 6 may make it possible to detect excessive temperatures in the air conditioning pipe, i.e. in the air conduit which leads to the humidifier unit 3. As shown in FIG. 1, the temperature sensor 6 is arranged in the airflow upstream of the humidifier unit 3.

The further temperature sensor 10, which is arranged in the air conduit continuing downstream of the humidifier unit 3, is not only designed to read the temperature but also the humidity of the air. Advantageously, the temperature sensor 10 can in this way be used for regulating the temperature when the cabin temperature reacts too slowly.

The humidifier unit 3, which can for example be designed as a direct evaporator, can take the water to be evaporated from the on-board fresh water system or from a separate water system. To separate the humidification system from the water system in this context, an automatic check valve 7 is provided which controls the water flow in a water pipe 8 to the humidifier unit 3. Advantageously, the water pipe 8 between the check valve 7 and the humidifier unit 3 is self draining. For example this can be achieved in that the diameter of the water pipe 8 is designed large enough, e.g. measuring at least one inch, or the valve 7 is designed to deaerate the water pipe 8.

In order to disinfect the entire humidification system or air conditioning system as shown in FIG. 1, and in order to prevent water ingress into the air conditioning system, the humidifier unit 3 is connected to an aircraft drainage system 9. To prevent return flow of the grey water and permanent air leakage of the air conditioning system, a protective component 14 can be integrated in the drainage system. This protective component 14 prevents return flow of the grey water and permanent air leakage of the air conditioning system. Although in FIG. 1 the protective component 14 is integrated in the drainage system which comprises the components 9 and 14 (for the sake of clarity, the entire drainage system is not shown in FIG. 1), the protective component 14 can also be arranged in or integrated in the humidifier unit 3.

Reference number 13 designates a controller which, as shown in FIG. 1, is connected to the temperature sensor 10 by means of a line 11. Furthermore, the controller 13 can be connected to the humidifier unit 3 by means of the line 12. As stated above, the temperature sensor 10 can also be designed for measuring the humidity of the air so that the controller 13 can be designed for controlling the humidifier unit 3. Furthermore, the controller 13 can be connected to the temperature sensor 6, the valve 4, the valve 7 and the protective component 14 and can control the function of the individual elements. Advantageously, the controller 13 controls operation of the air conditioning system such that humidification is controlled by means of a closed control loop. Moreover, the controller 13 can be connected to a data system of the aircraft (not shown in FIG. 1) and can for example transfer data for display in the cockpit.

Figure 2:
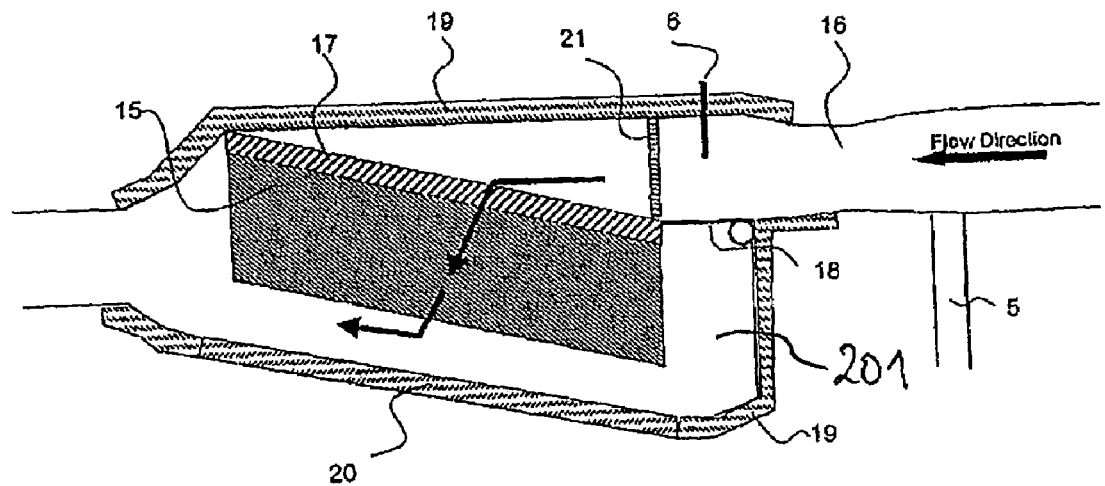
FIG. 2 shows a diagrammatic section view of an embodiment of an evaporator arrangement according to the present invention, as can be arranged in particular in air conditioning systems for aircraft.

FIG. 2 shows a diagrammatic section view of an evaporator arrangement according to the present invention as can also be used for example in an air conditioning system as shown in FIG. 1.

As shown in FIG. 2, the airflows provided by a central or decentralised mixer unit are fed in an air conduit to an evaporator unit or evaporator arrangement. The feeding air conduit comprises a diffuser 16, which can for example be designed as a throat in the air conduit. The temperature sensor 6 is provided in the air conduit, downstream of the diffuser 16. The airflow fed from the air conduit then passes an air direction device or a grille 21. The diffuser 16 is designed in such a way that it generates flow lines in the airflow which essentially move at the same speed. The grille 21, which can for example comprise a honeycomb structure, is arranged to further even out or adjust the flow speed of the airflow. In this way it can advantageously be achieved that the flow lines between the grille 21 and a flow direction device 17 are essentially parallel in relation to each other. Reference number 15 designates a direct evaporator which is arranged downstream of the flow direction device 17. According to one aspect of the present invention, the direct evaporator has a preferred flow-through direction, i.e. a direction in which an airflow can flow with very little resistance through the direct evaporator. According to the present invention, this direction is not necessarily orthogonal in relation to the flow direction of the airflow which is directed through the diffuser 16 and the grille 21 so as to provide long contact times between the volume flow and the evaporator surface. In FIG. 2 the flow direction device and the direct evaporator 15 are arranged at an angle of approximately 20° in relation to the direction of flow of the airflow. According to the present invention, this angle can be between 0° and approximately 90°.

As indicated by means of the arrows in FIG. 2, the air flowing from the direct evaporator 15 is fed to a further air conduit and is for example fed to further elements of an air conditioning system or directly into the cabin.

Reference number 18 designates a safety valve. The safety valve 18 is arranged between the air conduit for feeding the airflow to the air humidifier 15 and a bypass conduit 201. This makes it possible, for example, for the valve 18 to be opened when the grille 21, the flow direction device 17 or the direct evaporator 15 becomes blocked, so that the air can bypass these three elements.

The direct evaporator 15 can comprise an absorbent material which for example meets the relevant specifications relating to hygiene and safety in aircraft engineering. For example, such a material can be a conventional inorganic material, such as for example glass fibres bound in inorganic adhesives. The direct evaporator 15 can however also be made from polymer or metallic components. Moreover, polymer materials that are combustion resistant, temperature resistant and not biologically degradable can be used. A porous evaporator structure of the direct evaporator 15 advantageously comprises flow conduits 0.5 to 2 cm in diameter, which flow conduits do not necessarily have to be aligned so as to be orthogonal in relation to the inlet face.

According to one aspect of the present invention, the direct evaporator 15 is arranged at an inclination in relation to the flow direction. In other words, the absorbent material of the direct evaporator 15 is arranged across the flow direction. This may make possible a design of the evaporator arrangement, which design saves a great deal of space, as well as making possible easy integration in the air conditioning system. Furthermore, the inclined installation results in the cross-sectional area of the direct evaporator or of the evaporator unit being very large, so that the flow speed of the airflow through it is reduced and in turn the danger of particles or droplets being carried along is reduced.

As already indicated, a diffuser 16 can be arranged at the entry to the humidifier, which diffuser 16 slows down the flow speed of the airflow and evens it out so as to optimally use the existing surface of the direct evaporator 15. Advantageously, arranging the diffuser 16 with or without the grille 21 makes it possible to prevent different flow speeds which can lead to short flows in the front inlet region and to banking up in the rear region of the direct evaporator 15. In particular, by arranging the diffuser 16 and the grille 21, the occurrence of dead areas, for example in the acute angle in the end region of the direct evaporator 15 (in the region of reference number 17) may be prevented.

A temperature sensor 6, for example a hot-air temperature sensor, may be arranged downstream of the diffuser 16. This may allow to detect an overtemperature of the infed airflow. Arranging the temperature sensor between the diffuser and the direct evaporator 15 may be advantageous in a hot-air infeed just upstream of the evaporator (such as for example line 5, which leads into the air conduit just upstream of the evaporator arrangement), because the mixing distance between the fed-in hot air and the airflow is very short.

In order to achieve a further improvement in the flow through the porous surface of the direct evaporator 15, a flow direction device 17, realized in this particular embodiment as a honeycomb structure 17' of approx. 2 cm honeycomb diameter and 1 to 2 cm in depth, is provided upstream of the direct evaporator 15. It should be mentioned that geometric shapes other than honeycomb shapes are also possible. At the sharp edge, the honeycomb structure suddenly deflects the flow lines of the airflow and leads the airflow through the porous evaporator structure, i.e. through the direct evaporator 15.

The safety valve 18 mentioned earlier can for example comprise a calibrated spring-loaded flap. In the case of a blockage in the porous evaporator structure, i.e. a blockage of the grille 21 or in particular a blockage of the flow direction device 17 or of the direct evaporator 15, this flap is designed to maintain the safety-relevant function of providing cabin air. To this effect, the flap 18 can for example be designed or arranged such that if a certain pressure in the air conduit is reached, the bypass conduit is opened so that the air bypasses the elements 15, 17 and 21. In particular, a situation can be brought about in which the air does not have to flow through the direct evaporator 15.

A blockage can for example occur as a result of lodgement of extraneous matter introduced with the outside air, for example pieces of plastic, plastic foil or snow or ice issuing from the mixer unit. Above all on the ground on hot and humid days, snow might issue from the mixer unit so that in unfavourable cases the evaporator might get blocked.

Advantageously, the grille (or grid) 21 with the honeycomb structure can be adapted in such a way that apart from evening out the airflow it also provides additional mechanical protection to the direct evaporator 15.

The evaporator arrangement comprises a housing 19 in which a service flap 20 is provided. Both the housing 19 and the service flap 20 can comprise sound protection. In this way it is possible for the evaporator arrangement to be integrated on positions of sound absorbers. The sound protection can at the same time have an insulating effect so that any temperature loss above the evaporator arrangement can be kept to a minimum. However, it should be pointed out that embodiments are imaginable in which only one side of the evaporator arrangement can comprise a sound absorber or heat insulation.

The service flap can facilitate the exchange of the direct evaporator 15 and of other components.

Due to the very confined installation situation in the vicinity of the mixer unit, two or several temperature zones can be integrated in a common evaporator unit. To this effect, the volume flows to be humidified are separate from each other, e.g. arranged one on top of the other, or one below the other, or one beside the other. This combination of temperature zones in a unit is believed to offer an advantage in that the number of the mechanical and hydraulic interfaces is reduced.

In this way an air conditioning system or an evaporator arrangement is provided which is able to generate humidity of the air from 20 to 60% relative humidity at room temperature, without introducing an additional heat load into the cabin. By increasing the humidity of the air, the thermal comfort of the cabin air during flight can be improved.

The evaporator arrangement according to an exemplary embodiment of the present invention can be integrated in an air conditioning system to form an air conditioning system according to the invention. This may make it possible to reduce the installation space so that the height and the width can also be minimised. Furthermore, by providing a bypass conduit, a very safe arrangement may be provided because even a malfunction of the direct evaporator is believed to not impede the functionality of the entire air conditioning system.

Although the present invention has been described with reference to a humidifier arrangement in an air conditioning system for an aircraft, it should be pointed out that the present invention can also be applied to vehicle engineering generally.

In addition, it should be pointed out that "comprising" does not exclude any other elements or steps, and that "one" does not exclude a plural number. Furthermore, it should be pointed out that characteristics or steps which have been described with reference to one of the above embodiments can also be used in combination with other characteristics or steps of other embodiments described above. Any reference characters in the claims are not to be seen as limitations.

What is claimed is:

1. An evaporator arrangement for an air conditioning system of an aircraft, comprising:
    a main air conduit with an evaporator arranged in the main air conduit such that an airflow in the main air conduit flows through the evaporator;
    a bypass air conduit connected to the main air conduit such that at least a part of the airflow bypasses the evaporator; and
    a safety valve arranged between the main air conduit and the bypass air conduit such that if a threshold pressure in the main air conduit upstream of the evaporator is exceeded, at least part of the airflow is fed to the bypass conduit through the safety valve.

2. The evaporator arrangement of claim 1, further comprising:
    a diffuser provided in the main air conduit upstream of the evaporator; the diffuser being operable to form the airflow in such a way that the airflow comprises airflow lines of essentially identical speed.

3. The evaporator arrangement of claim 2, further comprising:
    a grille provided between the diffuser and the evaporator and operable to further adjust the speed of the airflow lines.

4. The evaporator arrangement of claim 1, further comprising:
    a temperature sensor arranged in a first flow direction of the airflow in the main air conduit upstream of the evaporator.

5. The evaporator arrangement of claim 1,
    wherein the evaporator is operable so that the airflow in the evaporator has a second airflow direction, and the airflow in the evaporator has a third airflow direction when the airflow impinges on the evaporator, the second airflow direction being not orthogonal in relation to the third airflow direction.

6. The evaporator arrangement of claim 5, further comprising a flow direction device including a honeycomb structure; the flow direction device being arranged on the evaporator in the third airflow direction to deflect flow lines of the airflow and feed them to the evaporator.

7. The evaporator arrangement of claim 1, further comprising:
    a sound absorbent housing encasing the evaporator arrangement.

8. The evaporator arrangement of claim 1,
    wherein the evaporator is a direct evaporator comprising an absorbent porous, inorganic material.

9. An air conditioning system for an aircraft, comprising: an evaporator arrangement of claim 1.

10. An evaporator pad for a direct evaporator of an air conditioning system of an aircraft, the air conditioning system having a main air conduit and a bypass conduit and the direct evaporator being positioned within the main air conduit, the evaporator pad comprising:
    an absorbent element with a flow-through direction, the absorbent element being arranged in the direct evaporator such that the airflow in the main air conduit flows through the absorbent element if the bypass conduit is not connected at least part of the airflow bypasses the absorbent element if the bypass conduit is connected; and
    a flow direction device including a honeycomb structure operative for reflecting flow lines of the air flow into the evaporator.

11. The evaporator pad of claim 10,
    wherein the flow direction device is arranged on the absorbent element in the flow-through direction, the flow-through direction being not orthogonal to an airflow direction of an airflow impinging on the absorbent element.

12. A method for operating an evaporator arrangement of an air conditioning system of an aircraft, wherein the evaporator arrangement includes a main air conduit, a bypass air conduit, an evaporator, and a safety valve arranged between the main air conduit and the bypass air conduit, the method comprising:

operating the evaporator in the main air channel such that an airflow in the main air conduit flows through the evaporator;
connecting the bypass conduit so that at least part of the airflow bypasses the evaporator; and
feeding at least part of the airflow to the bypass conduit through the safety valve if a threshold pressure in the main air conduit upstream of the evaporator is exceeded.

13. The method of claim 12, further comprising the step of:
measuring a temperature of the airflow upstream of the evaporator;
wherein the temperature is used for temperature control in the air conditioning system.

* * * * *